(12) United States Patent
Lee et al.

(10) Patent No.: US 9,137,757 B2
(45) Date of Patent: Sep. 15, 2015

(54) METHOD AND APPARATUS FOR POWER CONTROL IN HIGH SPEED PACKET ACCESS (HSPA) NETWORKS

(75) Inventors: Heechoon Lee, San Diego, CA (US); Sharad Deepak Sambhwani, San Diego, CA (US); Wesley A. Sampson, San Diego, CA (US); Harris S. Simon, San Diego, CA (US); Vijay K. Chellappa, San Diego, CA (US); Danlu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 259 days.

(21) Appl. No.: 13/024,058

(22) Filed: Feb. 9, 2011

(65) Prior Publication Data
US 2011/0199949 A1    Aug. 18, 2011

Related U.S. Application Data

(60) Provisional application No. 61/303,588, filed on Feb. 11, 2010, provisional application No. 61/304,231, filed on Feb. 12, 2010.

(51) Int. Cl.
*H04B 7/00* (2006.01)
*H04W 52/14* (2009.01)
(Continued)

(52) U.S. Cl.
CPC ............ *H04W 52/146* (2013.01); *H04W 52/16* (2013.01); *H04W 52/228* (2013.01); *H04W 52/286* (2013.01); *Y02B 60/50* (2013.01)

(58) Field of Classification Search
CPC ................. H04W 52/0209; H04W 52/0225; H04W 52/0229; H04W 52/0238; H04W 52/0245

USPC ................. 370/310, 328, 342–345, 464, 465; 455/422–425
See application file for complete search history.

(56) References Cited

U.S. PATENT DOCUMENTS 4,775,995 A   10/1988  Chapman et al.
5,524,275 A    6/1996  Lindell
(Continued)

FOREIGN PATENT DOCUMENTS

CN    1218340 A   6/1999
CN    1510849 A   7/2004
(Continued)

OTHER PUBLICATIONS

ETSI TS 136 101 V9.1.0, UE radio transmission and reception, 3GPP, Oct. 2009, 158 pages.*
(Continued)

*Primary Examiner* — Dmitry H Levitan
(74) *Attorney, Agent, or Firm* — Darren M. Simon (57) ABSTRACT

A wireless communication device includes: an antenna for receiving inbound signals on dual receive channels and transmitting outbound signals on dual transmit channels; a transceiver coupled to the antenna to receive the inbound signals from the antenna and convey the outbound signals; a power controller coupled to the transceiver to control power levels of the outbound signals so a maximum nominal power level of the outbound signals is a first power level; and a processor coupled to the transceiver and the antenna to cause the power controller to control the power levels of the outbound signals so if a power level of a received one of the inbound signals is below a threshold value, then the maximum nominal power level of the outbound signals is a second power level lower than the first power level, wherein the second power level is lower than the first power level.

36 Claims, 6 Drawing Sheets

(51) Int. Cl.
*H04W 52/16* (2009.01)
*H04W 52/22* (2009.01)
*H04W 52/28* (2009.01)

(56) References Cited

U.S. PATENT DOCUMENTS

| | | | |
|---|---|---|---|
| 2008/0233910 A1 | 9/2008 | Rofougaran et al. | |
| 2009/0191910 A1 | 7/2009 | Athalye et al. | |
| 2010/0111023 A1* | 5/2010 | Pelletier et al. | 370/329 |
| 2010/0118805 A1 | 5/2010 | Ishii et al. | |
| 2010/0157895 A1* | 6/2010 | Pani et al. | 370/328 |
| 2010/0239031 A1* | 9/2010 | Wallen | 375/260 |
| 2010/0273520 A1* | 10/2010 | Pelletier et al. | 455/522 |
| 2011/0038271 A1* | 2/2011 | Shin et al. | 370/252 |
| 2012/0008563 A1* | 1/2012 | Johansson et al. | 370/328 |
| 2012/0113935 A1* | 5/2012 | Lindoff et al. | 370/329 |
| 2012/0127905 A1* | 5/2012 | Lindoff et al. | 370/311 |

FOREIGN PATENT DOCUMENTS

| | | |
|---|---|---|
| CN | 101626610 A | 1/2010 |
| CN | 101796863 A | 8/2010 |
| JP | 2009065307 A | 3/2009 |
| JP | 2009267653 A | 11/2009 |
| TW | M366833 U | 10/2009 |
| WO | 2009094525 A1 | 7/2009 |
| WO | 2009132203 A1 | 10/2009 |
| WO | 2010105976 A1 | 9/2010 |
| WO | 2010124192 A2 | 10/2010 |

OTHER PUBLICATIONS

Ericsson et al., "Inner loop power control accuracy requirements for DC-HSUPA", 3GPP Draft, R4-092393_ILPC_DC_HSUPA_V2, 3rd Generation Partnership Project (3GPP), Mobile Competence Centre, 650, Route Des Lucioles, F-06921 Sophia-Antipolis Cedex, France, No. Los Angeles, CA, 20090625, Jun. 25, 2009, XP050353627, [retrieved on Jun. 25, 2009].
International Search Report and Written Opinion—PCT/US2011/024638, ISA/EPO—May 17, 2011 (100975WO).
3GPP TSG-RAN Meeting #28, Quebec, Canada, Jul. 1-3, 2005, pp. 1-4.
3GPP TS 36.101 V8.0.0 (Dec. 2007), pp. 1-45.
Qualcomm Europe: "Remaining Issues in E-TFC Selection in DC-HSUPA", 3GPP Draft, R2-095957, 3rd Generation Partnership Project (3GPP), Mobile Competence Centre, 650, Route Des Lucioles, F-06921 Sophia-Antipolis Cedex, France, No. Miyazaki, 20091012, Oct. 16, 2009, XP050390391, [retrieved on Oct. 6, 2009].
Interdigital, "E-TFC Selection for DC-HSUPA," R2-094802, 3GPP, Aug. 20, 2009, 5 Pgs.
Nokia Siemens Networks, "Summary of offline discussion on UL PC, R1-100815," 3GPP, Jan. 22, 2010, 7 Pgs.
Qualcomm Europe, "E-TFC Selection in UE for DC-HSUPA—Interface with RAN4," R2-097071, 3GPP, Nov. 3, 2009, 8 Pgs.
Taiwan Search Report—TW100104613—TIPO—Jul. 28, 2014 (100975TW).

* cited by examiner

METHOD AND APPARATUS FOR POWER CONTROL IN HIGH SPEED PACKET ACCESS (HSPA) NETWORKS

CLAIM OF PRIORITY UNDER 35 U.S.C. §119

The present Application for Patent claims priority to Provisional Application No. 61/303,588, entitled "Additional Maximum Power Reduction with Dual Uplink Transmissions in HSPA", filed Feb. 11, 2010; and to Provisional Application No. 61/304,231, entitled "Additional Maximum Power Reduction with Dual Uplink Transmissions in HSPA", filed Feb. 12, 2010, both of which are assigned to the assignee hereof and hereby expressly incorporated by reference herein.

BACKGROUND

1. Field

Aspects of the present disclosure relate generally to wireless communication systems, and more particularly, to a method and apparatus for power control for dual uplink transmissions in High Speed Packet Access (HSPA) networks.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple (NT) transmit antennas and multiple (NR) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

UMTS is constantly being enhanced to more efficiently support packet switched services because a significant shift from traditional circuit-switched, often constant bit-rate, services to Internet Protocol (IP) packet switched services is expected in the near future. However, UMTS Release 99, based on dedicated resource allocation per user, is not well suited for IP packet data traffic. Therefore, a technology referred to as High Speed Packet Access (HSPA) has been introduced to provide new features for UMTS and offers enhancements in end-to-end service provisioning for IP-based services.

HSPA is comprised of two mobile telephony protocols: High Speed Downlink Packet Access (HSDPA) and High Speed Uplink Packet Access (HSUPA). HSDPA allows networks based on UMTS to have increased downlink transfer speeds and capacity. HSUPA is a further technological improvement that provides increased uplink speeds and capacity. Dual-Cell HSUPA (DC-HSUPA) is a further improvement on HSPA by means of carrier aggregation in the uplink. The basic idea of this multicarrier feature is to achieve better resource utilization and spectrum efficiency by means of joint resource allocation and load balancing across the uplink carriers.

In DC-HSUPA, due to increased bandwidth in the uplink, a larger frequency separation is used between transmit and receive frequencies—as compared to single uplink transmission—to assist in the protection of DC-HSDPA reception. For those bands that do not have sufficient separation between transmit and receive frequencies, leakage from signals that are transmitted from the UE affect the reception of signals in the receive chain of the UE and result in a degradation of reception Signal-to-Noise Ratio (SNR). One way to address this issue is to revert to single uplink frequency operation by deactivating the secondary uplink frequency when transmitting using DC-HSUPA hinders receiving using DC-HSDPA in the UE. However, the deactivation of the secondary uplink frequency is beyond the control of the UE as it is a network operation.

SUMMARY

The described features generally relate to one or more improved systems, methods and/or apparatuses for power control for dual uplink transmissions in an HSPA network.

In one aspect of the disclosure, a device configured for wireless communication is provided that includes an antenna configured to receive inbound signals on dual receive channels and to transmit outbound signals on dual transmit channels; a transceiver coupled to the antenna and configured to receive the inbound signals from the antenna and to convey the outbound signals to the antenna; a power controller coupled to the transceiver and configured to control power levels of the outbound signals such that a maximum nominal power level of the outbound signals is a first power level; and a processor coupled to the transceiver and the antenna and configured to cause the power controller to control the power levels of the outbound signals such that if a power level of a received one of the inbound signals is below a threshold value, wherein the second power level is lower than the first power level, then the maximum nominal power level of the outbound signals is a second power level that is lower than the first power level.

In another aspect of the disclosure, a computer program product residing on a non-transitory computer-readable medium is provided that includes computer-readable instructions configured to cause a processor to receive inbound signals; transmit outbound signals; control power levels of the outbound signals such that a nominal maximum power level of the outbound signals is a first power level while power levels of the inbound signals are above a threshold value; and control the power levels of the outbound signals such that the nominal maximum power level of the outbound signals is a second power level while power levels of the inbound signals are below the threshold value, wherein the second power level is lower than the first power level.

In yet another aspect of the disclosure, a device configured for wireless communication is provided that includes an antenna configured to receive inbound signals on dual receive channels and to transmit outbound signals on dual transmit channels; a transceiver coupled to the antenna and configured to receive the inbound signals from the antenna and to convey the outbound signals to the antenna; and control means coupled to the transceiver and configured to control power levels of the outbound signals to ensure that a nominal power level of the outbound signals is less than or equal to a first power level while power levels of the inbound signals are above a threshold and to ensure that the nominal power level of the outbound signals is less than or equal to a second power level while the power levels of the inbound signals are below a threshold value, wherein the second power level is lower than the first power level.

In yet another aspect of the disclosure, a method of transmitting signals is provided that includes receiving an inbound signal; measuring a power level of the inbound signal; ensuring that outbound signals are transmitted with power levels less than or equal to a first power level while power levels of the inbound signals are above a threshold; and ensuring that the outbound signals are transmitted with power levels less than or equal to a second power level if a power level of a recently-received one of the inbound signals is below a threshold value, wherein the second power level is lower than the first power level.

In yet another aspect of the disclosure, an apparatus for wireless communication is provided that includes means for receiving an inbound signal on dual receive channels; means for measuring a power level of the inbound signal; means for ensuring that outbound signals are transmitted with power levels less than or equal to a first power level while power levels of the inbound signals are above a threshold; and means for ensuring that the outbound signals are transmitted with power levels less than or equal to a second power level if a power level of a recently-received one of the inbound signals is below a threshold value, wherein the second power level is lower than the first power level.

Further scope of the applicability of the described methods and apparatuses will become apparent from the following detailed description, claims, and drawings. The detailed description and specific examples, while indicating preferred embodiments, are given by way of illustration only, since various changes and modifications within the spirit and scope of the description will become apparent to those skilled in the art.

BRIEF DESCRIPTION OF THE DRAWINGS

The features, objects, and advantages of the disclosed methods and apparatuses will become more apparent from the detailed description set forth below when taken in conjunction with the drawings in which like reference characters identify correspondingly throughout and wherein.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
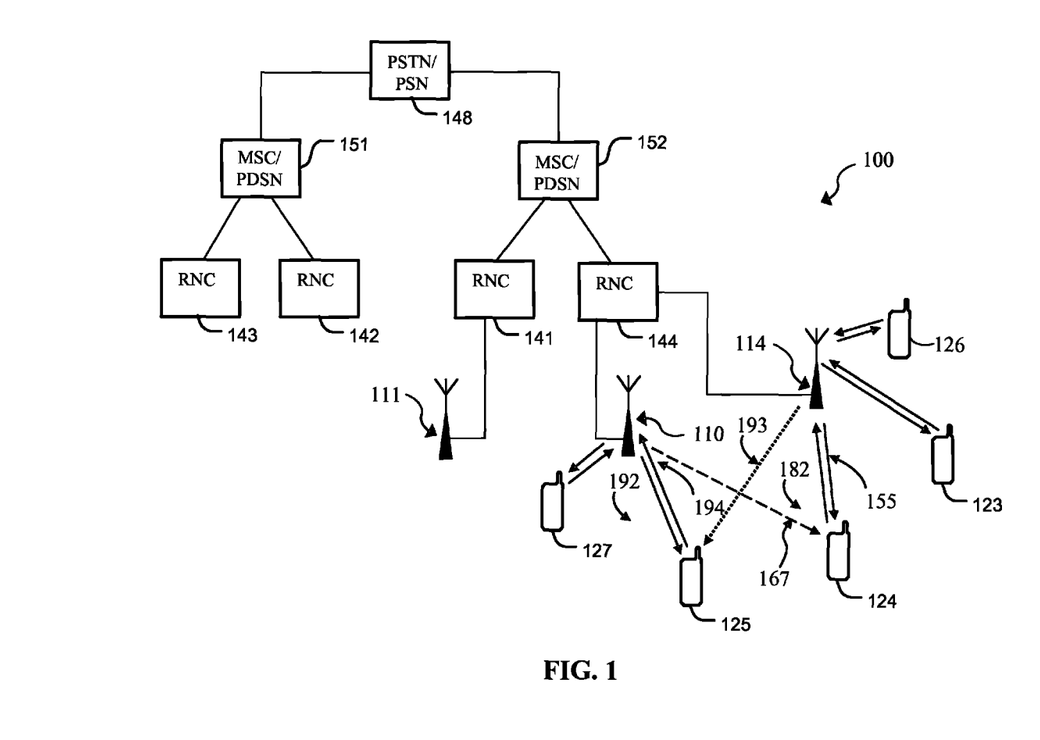
FIG. 1 is a block diagram of a wireless communications system in which various aspects of power control for dual uplink transmissions in an HSPA network may be implemented.

FIG. 1 illustrates a communication network 100, which includes radio network controllers (RNCs) 141-144 coupled to Node Bs 110, 111, and 114. The Node Bs 110, 111, 114 communicate with UE 123-127 through corresponding wireless connections 155, 167, 182, 192, 193, 194. A communications channel includes a forward link (FL), also known as a downlink, for transmissions from the Node Bs 110, 111, 114 to the UEs 123-127, and a reverse link (RL), also known as an uplink, for transmissions from the UE 123-127 to the Node B 110, 111, 114. The Radio Network Controllers 141-144 provide control functionalities for one or more Node Bs. The RNCs 141-144 are coupled to a public switched telephone network (PSTN) or a Packet Switched Network (PSN) 148 through Mobile Switching Centers (MSC) or Packet Data Server Nodes (PDSN) 151, 152, respectively. PSTN and PSN are generally illustrated in FIG. 1 as the same entity only to provide for, the RNCs 141-144 are coupled to 148 through a (not shown). Data interchange between various network elements, such as the radio network controllers 141-144 and a packet data server node, can be implemented using any number of protocols, for example, the Internet Protocol (IP), an asynchronous transfer mode (ATM) protocol, T1, E1, frame relay, or other protocols.

At the UE devices 123-127, the downlink signal is received by an antenna and routed to a receiver. The receiver filters, amplifies, quadrature demodulates, and quantizes the signal. The digitized signal is provided to a demodulator (DEMOD) where the digitized signal is despread with the short PNI and PNQ codes and decovered with the Walsh cover. The demodulated data is provided to a decoder that performs the inverse of the signal processing functions done at the Node Bs 110, 111, 114, specifically the de-interleaving, decoding, and CRC check functions. The decoded data is provided to a data sink.

Figure 2:
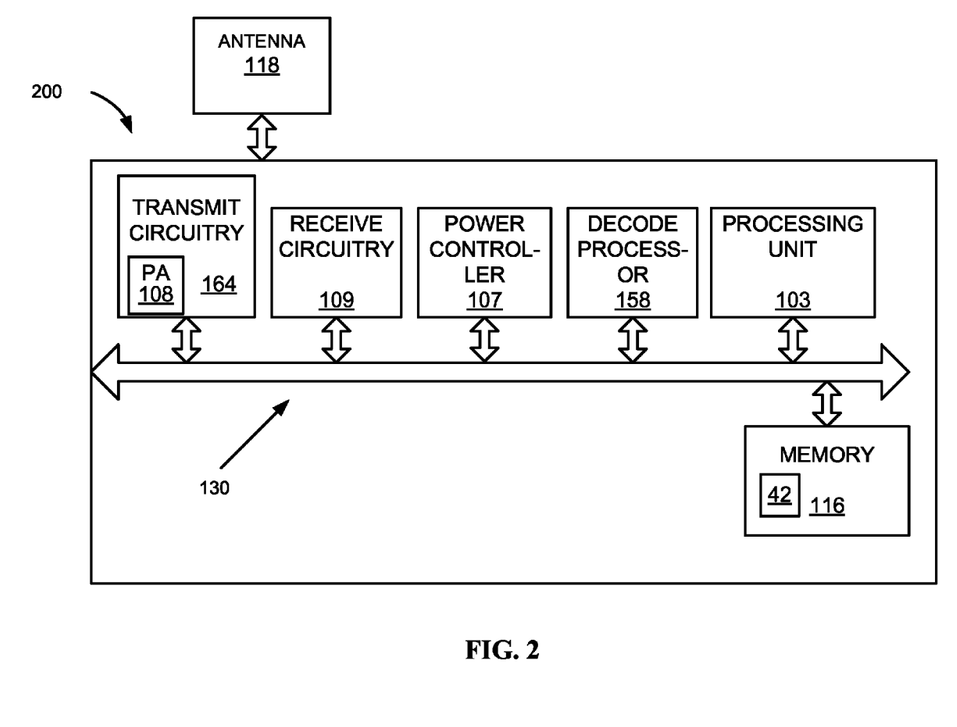
FIG. 2 is a block diagram of a UE illustrated in FIG. 1.

FIG. 2 illustrates a UE device 200 that is an embodiment of such UE devices as UE devices 123-127. The UE device 200 includes transmit circuitry 164 that includes a Power Amplifier (PA) 108, receive circuitry 109, a power controller 107, a decode processor 158, a processing unit 103 for use in processing signals, and a memory 116. The various components of the UE device 200 are coupled together by a bus system 130 that may include a power bus, a control signal bus, and a status signal bus in addition to a data bus. For the sake of clarity, the various busses are illustrated in FIG. 2 as the bus system 130.

The transmit circuitry 164 and the receive circuitry 109 allow transmission and reception, respectively, of information such as audio or data communications, between the UE device 200 and another wireless node such as another UE device or a Node B. The transmit circuitry 164 and receive circuitry 109 are coupled to an antenna 118. The antenna 118, the receive circuitry 109, and the processing unit 103 are configured to receive and process DC-HSDPA signals and the antenna 118, the transmit circuitry 164, and the processing unit 103 are configured to process and transmit DC-HSUPA signals.

In W-CDMA, packets are transmitted separately, with transport format combinations (TFC) defining power control for the PA 108 when transmitting the packets. The output power level of the PA 108 is not allowed to exceed the maximum communication device transmission power limit or Maximum Transmission Power Limit (MTPL), i.e., the maximum power level at which the PA 108 can support a waveform generated with a reference transmitter configuration while meeting specified or targeted Adjacent Channel Leakage Ratio (ACLR) requirements. In W-CDMA, the MTPL is based on the UEs power class, where one such class has a MTPL of 24 dBm. MTPL is also referred to as PMAX. Preventing the output power level of the PA 108 exceeding the MTPL is achieved by scaling the input waveform entering the PA 108 or changing the gain levels in the PA 108 itself as necessary. Maintaining a power amplifier's ACLR levels within a specified limit also requires input waveform power level variations to remain substantially within the power amplifier's linear range to avoid non-linear distortion (e.g., to avoid $3^{rd}$ order intermodulation products). Different transmit waveforms generated from different transmitter configurations can require different amounts of PA 108 linearity or linear headroom.

The processing unit 103 manages various operational aspects of the UE device 200, including power control, as further described herein. The processing unit 103 may also be referred to as a CPU. The memory 116, which may include both read-only memory (ROM) and random access memory (RAM), provides instructions and data to the processing unit 103. A portion of the memory 116 may also include non-volatile random access memory (NVRAM).

Figure 3:
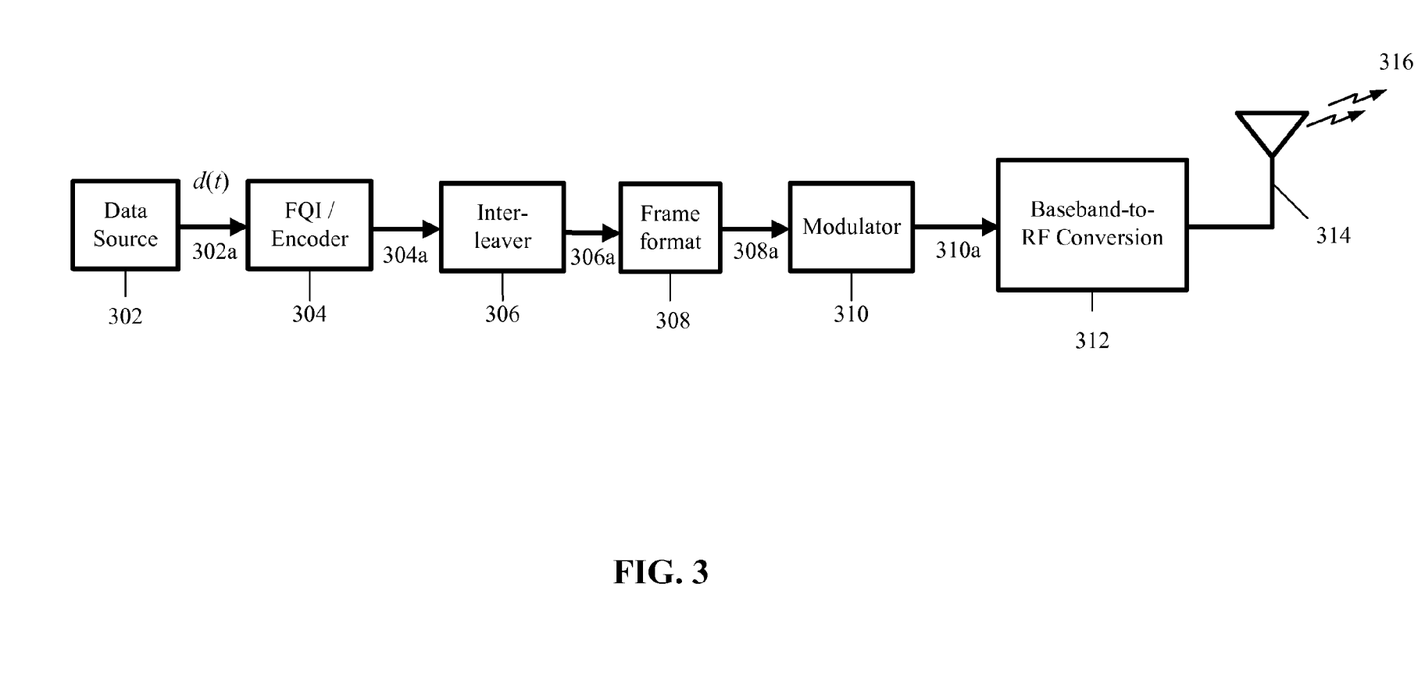
FIG. 3 is a functional block flow diagram of signals through structures of a transmitter.

FIG. 3 illustrates an example of a transmitter structure and/or process 300, which may be implemented at a UE device such as the UE devices 123-127. The functions and components shown in FIG. 3 may be implemented by software, hardware, or a combination of these. Other functions may be provided in addition to or instead of the functions shown in FIG. 3.

In FIG. 3, a data source 302 provides data d(t) or 302a to a frame quality indicator (FQI)/encoder 304. The FQI/encoder 304 may append an FQI such as a cyclic redundancy check (CRC) to the data d(t). The FQI/encoder 304 may further encode the data and FQI using one or more coding schemes to provide encoded symbols 304a. Each coding scheme may include one or more types of coding, e.g., convolutional coding, Turbo coding, block coding, repetition coding, other types of coding, or no coding at all. Other coding schemes may include automatic repeat request (ARQ), hybrid ARQ (H-ARQ), and incremental redundancy repeat techniques. Different types of data may be encoded with different coding schemes.

An interleaver 306 interleaves the encoded data symbols 306a in time to combat fading, and generates symbols 306a. The interleaved symbols of signal 306a may be mapped by a frame format block 308 to a pre-defined frame format to produce a frame 308a. A frame format may specify the frame as being composed of a plurality of sub-segments. Sub-segments may be any successive portions of a frame along a given dimension, e.g., time, frequency, code, or any other dimension. A frame may be composed of a fixed plurality of such sub-segments, each sub-segment containing a portion of the total number of symbols allocated to the frame. For example, according to the W-CDMA standard, a sub-segment may be defined as a slot. According to the cdma2000 standard, a sub-segment may be defined as a power control group (PCG). In one example, the interleaved symbols 306a are segmented into a plurality S of sub-segments making up a frame 308a.

A frame format may further specify the inclusion of, e.g., control symbols (not shown) along with the interleaved symbols 306a. Such control symbols may include, e.g., power control symbols, frame format information symbols, etc.

A modulator 310 modulates the frame 308a to generate modulated data 310a. Examples of modulation techniques include binary phase shift keying (BPSK) and quadrature phase shift keying (QPSK). The modulator 310 may also repeat a sequence of modulated data.

A baseband-to-radio-frequency (RF) conversion block 312 may convert the modulated signal 310a to RF signals for transmission via an antenna 314 as signal 316 over a wireless communication link to one or more Node B station receivers.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput. Although only one antenna is shown in FIG. 3 for simplicity, it should be noted that multiple antennas may be used to implement both transmit and receive diversity.

Spatial multiplexing may be used to transmit different streams of data simultaneously on the same frequency. The data steams may be transmitted to a single UE to increase the data rate or to multiple UEs to increase the overall system capacity. This is achieved by spatially precoding each data stream and then transmitting each spatially precoded stream through a different transmit antenna on the downlink. The spatially precoded data streams arrive at the UE(s) with different spatial signatures, which enables each of the UE(s) to recover the one or more the data streams destined for that UE. On the uplink, each UE may transmit one or more spatially precoded data streams, which enables the node B to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Referring to FIGS. 2 and 3, the processing unit 103 can instruct the power controller 107 to affect the power level of signals transmitted by the antenna 118, e.g., the signal 316 transmitted by the antenna 310. In one aspect of the power control approach, the processing unit 103 may affect the Maximum Power Reduction (MPR) of the UE device by selectively implementing/enforcing an Additional Maximum Power Reduction (A-MPR). The nominal maximum output power is defined by UE power classes in specification 3GPP TS 25.101. For DC-HSUPA, the nominal transmit power is defined by the sum of the broadband transmit power of each carrier in the UE device. With respect to the waveform, which is related to the power of the channelization codes, the UE device is allowed to reduce the nominal maximum power by the corresponding MPR. For example, the MPR may be 1.5 dB such that for an acceptable power of 23 dBm and an MPR of 1.5 dB, the maximum power would be 21.5 dBm. The A-MPR is an additional allowed MPR on top of the MPR determined by the waveform. Thus, continuing the example, if the A-MPR is 3 dB, then the maximum power with the A-MPR invoked would be 18.5 dBm. The reduction in the maximum power used by the UE device to transmit signals may be less than the MPR plus the A-MPR. The reduction may be dependent, for example, on the signal-to-noise ratio (SNR) and/or the signal-to-interference-and-noise ratio (SINR) of a recently-received HSDPA signal or signals.

UE transmission Power Headroom (UPH), which is the ratio of the maximum UE device transmission power and the corresponding Dedicated Physical Control CHannel (DPCCH) code power, is given by:

$$UPH = P\text{max},tx/PDPCCH,$$

where Pmax,tx is the UE device maximum transmission power and PDPCCH is the transmitted code Power on the DPCCH. In one aspect of the power control, Pmax,tx is given by:

$$P\text{max},tx = \min\{\text{Maximum allowed } UL\ TX\ \text{Power}, P\text{max}\},$$

where the Maximum allowed UL TX Power is set by UTRAN; and Pmax is the UE device nominal maximum output power according to the UE device power class.

The processing unit 103 determines and implements the applicability of A-MPR (additional MPR on top of the MPR determined by the waveform) in DC-HSUP, as further described herein. By instructing the power controller 107 in accordance with the A-MPR, the amount of Tx leakage into Rx frequency can be reduced or limited to help ensure acceptable reception of DC-HSDPA signals while employing dual uplink transmission.

The processing unit 103 is configured to employ two options to apply the A-MPR. First, the processing unit 103 can allow the power controller 107 to apply the A-MPR if the received signal power level is below a certain threshold. Second, the processing unit can allow the power controller 107 to apply the A-MPR regardless of the power level of the received signal. In either of these cases, if the UE device supports Rx diversity, then the processing unit 107 may allow the power controller 107 to apply the A-MPR when the UE device is operating without Rx diversity. Application of the A-MPR in the UE device will be reflected in the computation of Pmax, which is used for UPH and Enhanced uplink Transport Format Combinations (E-TFCs) and indicates to the Node B the power available for data transmission to determine the data rate supportable by the UE device. The UE nominal maximum output power level Pmax will be backed off by the amount of the A-MPR.

Figure 4:
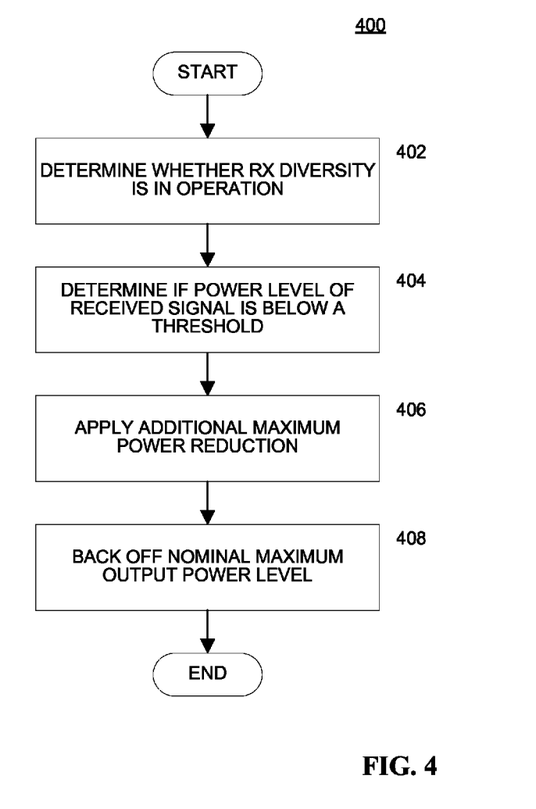
FIG. 4 is a flow diagram of a power control process for dual uplink transmissions in accordance with one aspect of the power control approach disclosed herein.
Figure 5:
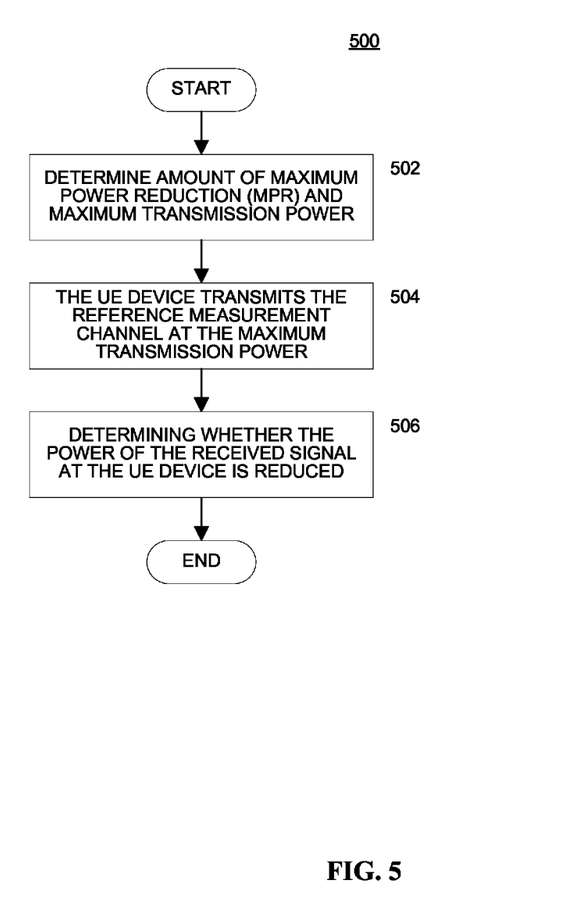
FIG. 5 is a flow diagram of a power control detection process for determining whether a UE is applying a power control process in accordance with one aspect of the power control approach disclosed herein.
Figure 6:
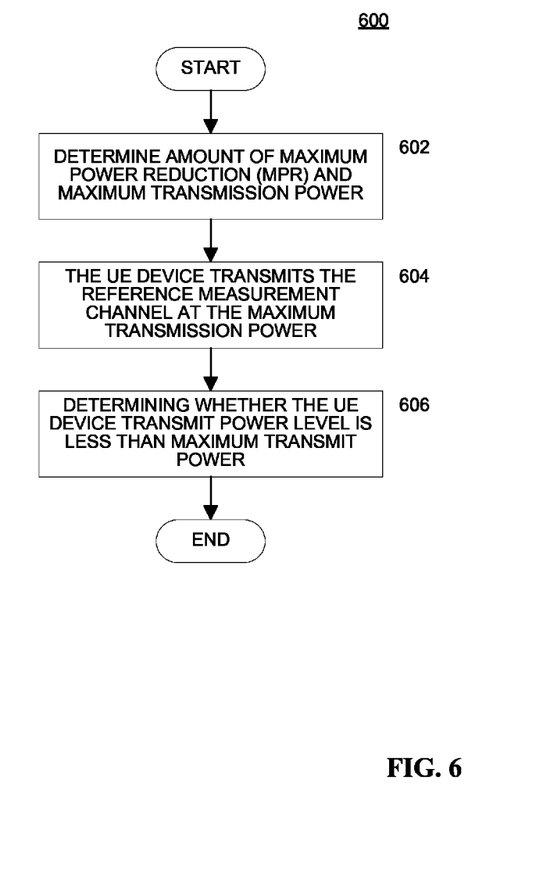
FIG. 6 is a flow diagram of another power control detection process for determining whether a UE is applying a power control process in accordance with one aspect of the power control approach disclosed herein.

FIGS. 4-6 illustrates various methodologies in accordance with various aspects of the power control approach for dual uplink transmissions. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning now to FIG. 4, a power control process 400 for dual uplink transmission is illustrated. The power control process 400 allows the use of the A-MPR by the UE device when the received signal power level is below a certain threshold. As previously disclosed, by applying the A-MPR, the amount of Tx leakage into Rx frequency may be limited so that the reception of DC-HSDPA may be ensured even with dual uplink transmission.

At 402, where the UE device supports Rx diversity, it is determined whether the UE device is currently utilizing Rx diversity. The power controller will be allowed to apply the A-MPR when the UE device is operating without Rx diversity.

At 404, the UE device will, upon receiving an inbound DC-HSDPA signal, determine if the received signal power level is below a certain threshold. In one aspect of the disclosed approach, the threshold may also be based on the SNR or the SINR of the received signal.

At 406, the UE will ensure that outbound DC-HSUPA signals are transmitted with power levels less than or equal to a first power level while power levels of the inbound signals are above a threshold. The first power level may be based on the MPR. Further the UE will ensure that the outbound DC-HSUPA signals are transmitted with power levels less than or equal to a second power level if a power level of a recently-received one of the inbound signals is below a threshold value, wherein the second power level is lower than the first power level In one aspect, to vary between different power levels such as the first and second power levels, the UE will apply the A-MPR. As disclosed above, application of the A-MPR in the UE device will be reflected in the computation of Pmax.

At 408, the UE nominal maximum output power level Pmax will be backed off by the amount of the A-MPR. Pmax will be used for UPH and E-TFCs and indicates to the Node B the power available for data transmission to determine the data rate supportable by the UE device.

Turning now to FIG. 5, a power control detection process 500 for dual uplink transmission is illustrated. The power control detection process 500, may be used to detect the use of an A-MPR by the UE device when the received signal power level is below a certain threshold. In one aspect of the detection approach, a simulated Node B may be used to test for the application of the A-MPR.

At 502, with regard to the transmission of the reference measurement channel for DC-HSUPA, the amount of MPR is pre-determined. Thus, the maximum transmission power of the UE device is determinable based on the fact that the amount of MPR is pre-determined.

At 504, the UE device will be caused to transmit on a reference measurement channel at its maximum power level. In one aspect of the disclosed approach, the UE device will transmit at its maximum power level because the simulated Node B will send a power control UP command continuously to the UE device.

At 506, by reducing the power of the received signal at the UE device, eventually the UE device will reduce its maximum transmission power. If an A-MPR is being applied by the UE device, then the maximum transmission power level of the UE device that is measured should be lower than the maximum transmission power determined at 502.

Thus, in the case where an A-MPR is applied by the UE device if the received power level at the UE device is below a threshold, the power of the received signal at the UE device will be reduced and the transmission power may be measured to verify that the UE device has reduced the maximum transmission power by the A-MPR because the received signal power is below the threshold value.

Turning now to FIG. 6, a power control detection process 600 for dual uplink transmission is illustrated. The power control detection process 600, may be used to detect the use of an A-MPR by the UE device when the received signal power level is below a certain threshold. In one aspect of the detection approach, a simulated Node B may be used to test for the application of the A-MPR.

At 602, with regard to the transmission of the reference measurement channel for DC-HSUPA, the amount of MPR is pre-determined. Thus, the maximum transmission power of the UE device is determinable based on the fact that the amount of MPR is pre-determined.

At 604, the UE device will be caused to transmit on a reference measurement channel at its maximum power level. In one aspect of the disclosed approach, the UE device will transmit at its maximum power level because the simulated Node B will send a power control UP command continuously to the UE device.

At 606, in the case where A-MPR is applied by the UE device regardless of the power level of the received signal, the UE device transmit power level will be confirmed to be less than the max transmit power as determined by the waveform (reference measurement channel) and UE device power class regardless of the received signal power.

In one aspect of the power control detection processes disclosed herein, the determination is performed without Rx diversity at the UE device. In another aspect of the disclosed approach for power control detection, where the UE device supports Rx diversity the above-mentioned tests are performed with Rx diversity. However, the transmission power is measured to ensure that the maximum transmission power is not reduced in addition to the MPR, unlike the test without Rx diversity.

Several aspects of a telecommunications system have been presented with reference to a W-CDMA system. As those skilled in the art will readily appreciate, various aspects described throughout this disclosure may be extended to other telecommunication systems, network architectures and communication standards.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A device configured for wireless communication, the device comprising:
   an antenna of the device configured to receive an inbound downlink signal, from a wireless node external to the device, on dual receive channels and to transmit an outbound uplink signal on dual transmit channels;
   a transceiver of the device coupled to the antenna and configured to receive the inbound downlink signal from the antenna and to convey the outbound uplink signal to the antenna;
   a power controller of the device coupled to the transceiver and configured to control a power level of the outbound uplink signal such that a maximum nominal power level of the outbound uplink signal is a first power level; and
   a processor of the device coupled to the transceiver and the antenna and configured to cause the power controller to control the power level of the outbound uplink signal such that, in response to determining that a received signal power level of the inbound downlink signal is below a threshold value, the maximum nominal power level of the outbound uplink signal is reduced to a second power level that is lower than the first power level to limit an amount of a leakage of the outbound uplink signal into a frequency of the inbound downlink signal,
   wherein the antenna, the transceiver, the power controller, and the processor are coupled to a bus system in a wired manner.

2. The device of claim 1, wherein the transceiver and the processor are configured to process the inbound downlink and outbound uplink signals where the inbound downlink signal comprises a Dual-Cell High Speed Downlink Packet Access (DC-HSDPA) signal and the outbound uplink signal comprises a Dual-Cell High Speed Uplink Packet Access (DC-HSUPA) signal, and wherein the first power level is a function of a Maximum Power Reduction (MPR) value.

3. The device of claim 2, wherein the second power level is a function of the MPR value and an Additional Maximum Power Reduction (A-MPR) value.

4. The device of claim 1, wherein the processor is further configured to cause the power controller to adjust the second power level.

5. The device of claim 4, wherein adjusting the second power level is achieved in accordance with at least one of a signal-to-noise ratio (SNR) or a signal-to-interference-and-noise ratio (SINR) of the inbound downlink signal.

6. The device of claim 1, wherein the processor is configured to determine a user equipment (UE) transmission power headroom (UPH) value using at least one of an MPR value or an A-MPR value and to provide the UPH value to the transceiver for transmission to a Node B.

7. The device of claim 1, wherein the processor is further configured to determine whether the device supports receive (Rx) diversity.

8. The device of claim 1, wherein the processor is further configured to determine whether the device is currently utilizing receive (Rx) diversity.

9. The device of claim 1, wherein the first power level is based on a power reduction value and the second power level is based on an additional power reduction value.

10. The device of claim 1, wherein the second power level is determined by backing off the maximum nominal power level of the outbound uplink signals by a second power reduction value that is in addition to a first power reduction value.

11. The device of claim 10, wherein the first power reduction value comprises a Maximum Power Reduction (MPR) value and the second power reduction value comprises an Additional MPR (A-MPR).

12. The device of claim 1, wherein the wireless node comprises one of a user equipment (UE) or a Node B.

13. A non-transitory computer-readable medium comprising computer-readable instructions configured to cause a processor to:
   receive, by the processor of a wireless communication device, an inbound downlink signal, from a wireless node external to the wireless communication device, on dual receive channels;
   transmit, from the processor, an outbound uplink signal on dual transmit channels;
   control, by the processor, a power level of the outbound uplink signal such that a nominal maximum power level of the outbound uplink signal is a first power level while a received signal power level of the inbound downlink signal is above a threshold value; and
   control, by the processor, the power level of the outbound uplink signal such that the nominal maximum power level of the outbound uplink signal is reduced to a second power level in response to determining that the received signal power level of the inbound downlink signal is below the threshold value, the second power level being lower than the first power level, to limit an amount of a leakage of the outbound uplink signal into a frequency of the inbound downlink signal.

14. The computer-readable medium of claim 13, wherein the inbound downlink signal comprises a Dual-Cell High Speed Downlink Packet Access (DC-HSDPA) signal and the outbound uplink signal comprises a Dual-Cell High Speed Uplink Packet Access (DC-HSUPA) signal, and wherein the first power level is a function of a Maximum Power Reduction (MPR) value.

15. The computer-readable medium of claim 14, wherein the second power level is a function of the MPR value and an Additional Maximum Power Reduction (A-MPR) value.

16. The computer-readable medium of claim 15, further comprising computer-readable instructions configured to cause the processor to:
   determine a user equipment (UE) transmission power headroom (UPH) value using at least one of the MPR value or the A-MPR value; and
   send an indication of the UPH value to a Node B.

17. The computer-readable medium of claim 13, further comprising computer-readable instructions configured to cause the processor to adjust the second power level.

18. The computer-readable medium of claim 17, wherein adjusting the second power level is achieved in accordance with at least one of a signal-to-noise ratio (SNR) or a signal-to-interference-and-noise ratio (SINR) of the inbound downlink signal.

19. A device configured for wireless communication, the device comprising:
   an antenna of the device configured to receive an inbound downlink signal, from a wireless node external to the device, on dual receive channels and to transmit an outbound uplink signal on dual transmit channels;
   a transceiver of the device coupled to the antenna and configured to receive the inbound downlink signal from the antenna and to convey the outbound uplink signal to the antenna; and
   control means of the device coupled to the transceiver and configured to control a power level of the outbound uplink signal to ensure that a nominal power level of the outbound uplink signal is less than or equal to a first power level in response to determining that a received signal power level of the inbound downlink signal is above a threshold value and to ensure that the nominal power level of the outbound uplink signals is less than or equal to a second power level in response to determining that the received signal power level of the inbound downlink signal is below the threshold value, the second power level being lower than the first power level, to limit an amount of a leakage of the outbound uplink signal into a frequency of the inbound downlink signal
   wherein the antenna, the transceiver, and the control means are coupled to a bus system in a wired manner.

20. The device of claim 19, wherein the transceiver and the control means are configured to process the inbound and outbound uplink signals where the inbound downlink signal comprises a Dual-Cell High Speed Downlink Packet Access (DC-HSDPA) signal and the outbound uplink signal comprises a Dual-Cell High Speed Uplink Packet Access (DC-HSUPA) signal, and wherein the first power level is a function of a Maximum Power Reduction (MPR) value.

21. The device of claim 20, wherein the second power level is a function of the MPR value and an Additional Maximum Power Reduction (A-MPR) value.

22. The device of claim 19, wherein the control means is further configured to adjust the second power level.

23. The device of claim 22, wherein adjusting the second power level is achieved in accordance with at least one of a signal-to-noise ratio (SNR) or a signal-to-interference-and-noise ratio (SINR) of the inbound downlink signal.

24. The device of claim 19, wherein the control means is further configured to:
   determine a user equipment (UE) transmission power headroom (UPH) value using at least one of an MPR value or an A-MPR value; and
   send an indication of the UPH value to a Node B.

25. A method for wireless communication, the method comprising:
   receiving, at a first wireless communication device, an inbound downlink signal, from a second wireless communication device external to the first wireless communication device, on dual receive channels;
   measuring a received signal power level of the inbound downlink signal;
   ensuring that an outbound uplink signal is transmitted with a power level of the outbound uplink signal less than or equal to a first power level while the received signal power level of the inbound downlink signal is above a threshold value; and
   ensuring that the outbound uplink signal is transmitted with the power level of the outbound uplink signal less than or equal to a second power level in response to determining that the received signal power level of the inbound downlink signal is below the threshold value, the second power level being lower than the first power level, to limit an amount of a leakage of the outbound uplink signal into a frequency of the inbound downlink signal.

26. The method of claim 25, wherein the inbound downlink signal comprises a Dual-Cell High Speed Downlink Packet Access (DC-HSDPA) signal and the outbound uplink signal comprises a Dual-Cell High Speed Uplink Packet Access (DC-HSUPA) signal, and wherein the first power level is a function of a Maximum Power Reduction (MPR) value.

27. The method of claim 26, wherein the second power level is a function of the MPR value and an Additional Maximum Power Reduction (A-MPR) value.

28. The method of claim 25, further comprising adjusting the second power level.

29. The method of claim 28, wherein adjusting the second power level is achieved in accordance with at least one of a signal-to-noise ratio (SNR) or a signal-to-interference-and-noise ratio (SINR) of the inbound downlink signal.

30. The method of claim 25, further comprising:
   determining a user equipment (UE) transmission power headroom (UPH) value using at least one of an MPR value or an A-MPR value; and
   sending an indication of the UPH value to a Node B.

31. An apparatus for wireless communication, comprising:
   means for receiving, of the apparatus, an inbound downlink signal, from a wireless node external to the apparatus, on dual receive channels;
   means for measuring, of the apparatus, a received signal power level of the inbound downlink signal;
   means for ensuring, of the apparatus, that an outbound uplink signal is transmitted with a power level of the outbound uplink signal less than or equal to a first power level while the received signal power level of the inbound downlink signal is above a threshold value; and
   means for ensuring, of the apparatus, that the outbound uplink signal is transmitted with the power level of the outbound uplink signal less than or equal to a second power level in response to determining that the received signal power level of the inbound downlink signal is below the threshold value, the second power level being lower than the first power level, to limit an amount of a leakage of the outbound uplink signal into a frequency of the inbound downlink signal.

32. The apparatus of claim 31, wherein the inbound downlink signal comprises a Dual-Cell High Speed Downlink Packet Access (DC-HSDPA) signal and the outbound uplink signal comprises a Dual-Cell High Speed Uplink Packet Access (DC-HSUPA) signal, and wherein the first power level is a function of a Maximum Power Reduction (MPR) value.

33. The apparatus of claim 32, wherein the second power level is a function of the MPR value and an Additional Maximum Power Reduction (A-MPR) value.

34. The apparatus of claim 31, further comprising means for adjusting the second power level.

35. The apparatus of claim 34, wherein the means for adjusting the second power level is achieved in accordance with at least one of a signal-to-noise ratio (SNR) or a signal-to-interference-and-noise ratio (SINR) of the inbound downlink signal.

36. The apparatus of claim 31, further comprising:
means for determining a user equipment (UE) transmission power headroom (UPH) value using at least one of an MPR value or an A-MPR value; and
means for sending an indication of the UPH value to a Node B.

* * * * *